(12) United States Patent
Yoo et al.

(10) Patent No.: US 9,270,153 B2
(45) Date of Patent: *Feb. 23, 2016

(54) ENERGY REGENERATION DEVICE OF SUSPENSION SYSTEM FOR VEHICLE REGENERATING ROTATIONAL KINETIC ENERGY GENERATED FROM WHEELS INTO ELECTRIC ENERGY

(71) Applicant: Hyundai Motor Company, Seoul (KR)

(72) Inventors: Sang Hoon Yoo, Asan-Si (KR); Sung Bae Jang, Suwon-si (KR); Byung Gu Kang, Seoul (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 51 days.

This patent is subject to a terminal disclaimer.

(21) Appl. No.: 14/135,321

(22) Filed: Dec. 19, 2013

(65) Prior Publication Data

US 2014/0183873 A1 Jul. 3, 2014

(30) Foreign Application Priority Data

Dec. 31, 2012 (KR) .......................... 10-2012-0158597

(51) Int. Cl.
*F03G 7/08* (2006.01)
*H02K 7/18* (2006.01)

(52) U.S. Cl.
CPC ................ *H02K 7/1853* (2013.01); *F03G 7/08* (2013.01)

(58) Field of Classification Search
CPC .................. B60G 2204/143; B60G 2204/41; B60G 2204/419; B60G 2204/4191; B60G 2300/50; B60G 2300/60; B60G 7/006; B60G 7/02; B60G 2200/1442; B60G 2202/12; B60G 2202/135; B60G 2202/24; B60G 2202/42; B60G 3/202; B60K 25/10; F03G 7/08; H02K 7/1846; H02K 7/1853; Y10T 74/1856

See application file for complete search history.

(56) References Cited

U.S. PATENT DOCUMENTS

| | | | | | |
|---|---|---|---|---|---|
| 1,557,570 | A | * | 10/1925 | Eckman et al. | 180/65.31 |
| 3,981,204 | A | * | 9/1976 | Starbard | 74/34 |
| 4,387,781 | A | * | 6/1983 | Ezell et al. | 180/65.22 |
| 4,825,656 | A | * | 5/1989 | Gardner, Jr. | 60/668 |
| 8,573,604 | B2 | * | 11/2013 | Willems | 280/5.5 |
| 8,682,550 | B2 | * | 3/2014 | Nelson et al. | 701/58 |
| 9,030,033 | B2 | * | 5/2015 | Yoo et al. | 290/1 C |
| 2010/0207309 | A1 | * | 8/2010 | Park | 267/195 |
| 2011/0001322 | A1 | * | 1/2011 | Armani et al. | 290/1 R |
| 2012/0000722 | A1 | * | 1/2012 | Pintos Pintos | 180/165 |
| 2012/0146339 | A1 | * | 6/2012 | Lee | 290/1 |
| 2014/0182955 | A1 | * | 7/2014 | Yoo et al. | 180/65.31 |
| 2014/0191512 | A1 | * | 7/2014 | Liao et al. | 290/1 R |

FOREIGN PATENT DOCUMENTS

| | | |
|---|---|---|
| JP | 2001-55033 A | 2/2001 |
| KR | 10-2010-0093803 A | 8/2010 |

* cited by examiner

*Primary Examiner* — Tulsidas C Patel
*Assistant Examiner* — S. Mikailoff
(74) *Attorney, Agent, or Firm* — Morgan, Lewis & Bockius LLP

(57) ABSTRACT

An energy regeneration device of a suspension system for a vehicle, includes a suspension link that connects a wheel carrier to a vehicle body, a bush unit that is disposed between a vehicle body connection portion of the suspension link and the vehicle body and outputs hinge motion of the suspension link through an output gear, a one-way power transmission mechanism that is connected with the output gear of the bush unit, receives the hinge motion transmitted from the output gear through an input gear, and outputs only one-way rotational power, and a generator that is disposed at a side of the vehicle body and generates electricity while being rotated by the transmitted one-way rotational power.

13 Claims, 8 Drawing Sheets

ENERGY REGENERATION DEVICE OF SUSPENSION SYSTEM FOR VEHICLE REGENERATING ROTATIONAL KINETIC ENERGY GENERATED FROM WHEELS INTO ELECTRIC ENERGY

CROSS-REFERENCE TO RELATED APPLICATION

The present application claims priority to Korean Patent Application No. 10-2012-0158597 filed on Dec. 31, 2012, the entire contents of which is incorporated herein for all purposes by this reference.

BACKGROUND OF THE INVENTION

1. Field of the Invention

The present invention relates to an energy regeneration device of a suspension system for a vehicle. More particularly, the present invention relates to an energy regeneration device of a suspension system for a vehicle which is mounted at a vehicle body connection portion of a suspension link and regenerates rotational kinetic energy generated from wheels into electric energy.

2. Description of Related Art

In general, the suspension system of a vehicle is a device that is disposed between the vehicle body and the wheels and connecting the two rigid bodies, using one or a plurality of links. The suspension system mechanically controls the relative motion between the vehicle body and the wheels by carrying vertical motion load with a chassis spring and a shock absorber and controlling high rigidity and flexibility in the other directions.

The suspension system provides improved riding comfort to passengers by effectively blocking irregular input from roads which is generated during vehicle travel and provides convenience for driving by controlling shaking of a vehicle which is generated by uneven roads. Further, when a vehicle travels on an uneven road, vehicle safety must be maintained when turning and braking by maintaining the vertical load on the surfaces of tires which are in contact with the ground at an appropriate level.

Various kinds of suspension systems have been developed and are used for vehicles to satisfy those conditions, and according to an example of the configuration of a common suspension system, as shown in FIG. 1, a wheel carrier 4 supports a wheel 2 to cause the wheel 2 to rotate is provided. The upper portion of the wheel carrier 4 is connected to a vehicle body 10 (e.g., vehicle subframe) by a front upper arm 6 and a rear upper arm 8 disposed in the transverse direction of the vehicle and the lower portion is connected to the vehicle body 10 by a lower arm 12 and an assist arm 14 which are disposed in the transverse direction of the vehicle and a trailing arm 16 disposed in the longitudinal direction of the vehicle.

Further, the upper portion of the wheel carrier 4 is connected with the vehicle body by a shock absorber 18 and a spring 20, an elastic member, is disposed between the lower arm 12 and the vehicle body, to attenuate the shock applied from a road surface and reduce free vibration to improve riding comfort. Additionally, the end of a stabilizer bar 22 that is fixed to the vehicle body is connected with the lower arm 12 by a connection link 24, to prevent the vehicle body from rolling.

According to the configuration, the suspension system of the related art can attenuate the shock from a road surface, reduce free vibration, and prevent the vehicle body from rolling; however, the kinetic energy, which is generated by the suspension links 6, 8, 12, 14, and 16 which continuously repeat bumping and rebounding based on the traveling conditions of the vehicle, is not recovered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an energy regeneration device of a suspension system for a vehicle having advantages of being able to increase energy efficiency by regenerating kinetic energy from bumping and rebounding of a wheel, depending on traveling condition, into electric energy.

Further, the present invention provides an energy regeneration device of a suspension system for a vehicle which absorbs unnecessary torsional force and increase transmission efficiency of rotational power by fixing an output gear of a bushing unit, which is disposed at a vehicle body connection portion of a suspension link, in a rotation direction with respect to the suspension link.

In an aspect of the present invention, an energy regeneration device of a suspension system for a vehicle, may include a suspension link that connects a wheel carrier to a vehicle body, a bushing unit that is disposed between a vehicle body connection portion of the suspension link and the vehicle body and outputs hinge motion of the suspension link through an output gear, a one-way power transmission mechanism that is engaged with the output gear of the bushing unit, receives the hinge motion transmitted from the output gear through an input gear, and outputs only one-way rotational power, and a generator that is disposed at a side of the vehicle body, is engaged with the one-way power transmission mechanism, and generates electricity while being rotated by the transmitted one-way rotational power, wherein the bushing unit may include an outer pipe combined with the vehicle body connection portion of the suspension link and of which a plurality of rotation protrusion are formed to an internal circumference thereof, an inner pipe disposed inside the outer pipe and fixed to a side of the vehicle body, a rubber bushing disposed between the outer pipe and the inner pipe and bonded to the outer pipe, an output gear coupled with the rubber bushing through an inner extension that extends between the rubber bushing and the inner pipe, and of which a plurality of supporting protrusion are formed to an external circumference of the inner extension, a bearing support ring fixed to an inner side of the inner extension of the output gear, and a first bearing disposed on an outer side of the inner pipe in friction contact with the bearing support ring.

The energy regeneration device may further include a speed-up mechanism that couples the generator and the one-way power transmission mechanism, speeds up one-way rotational power transmitted from the one-way power transmission mechanism, and transmits the one-way rotational power increased in speeds to a rotary shaft of the generator, a rectifier that is electrically connected with the generator and rectifies the electricity generated by the generator, and a battery that is electrically connected with the rectifier and accumulates electric energy.

The plurality of rotation protrusions and the supporting protrusions are formed at a predetermined distance from each other, and two supporting protrusions as a pair are disposed between two rotation protrusions.

The energy regeneration device mat may further include a seal ring configured to seal between the first bearing and the bearing support ring.

The seal ring is formed integrally with a stopper fixed to the interior circumference of the bearing support ring.

The one-way power transmission mechanism may include an inner case, an outer case combined with the inner case and having a bolt insertion pipe in which a bolt is inserted, an input gear engaged with the output gear of the bushing unit inside the inner case and the outer case and having an outer extension extending axially outward, a third bearing disposed between an outer side of the input gear and an inner side of the inner case, a fourth bearing disposed between an inner side of the outer extension and an outer side of the bolt insertion pipe, a one-way clutch disposed on an outer side of the external extension, a speed-up gear disposed on an outer side of the one-way clutch, and one or more idle gears transmitting one-way rotational power to the speed-up mechanism in mesh with the speed-up gear.

The one-way clutch transmits rotational power from the output gear of the bushing unit to the speed-up gear in bumping or in rebounding of the suspension link.

The speed-up mechanism may include a speed-up mechanism housing integrally formed between the generator and the one-way power transmission mechanism, and one or more planetary gear sets disposed in the speed-up mechanism housing.

The one or more planetary gear sets are single pinion planetary gear sets.

The one or more planetary gear sets are three single pinion planetary gear sets.

A ring gear of each of the single pinion gear sets is fixed to the speed-up mechanism housing and functions as a fixed element, a planetary carrier thereof functions as an input element, and a sun gear thereof functions as an output element.

The three planetary gear sets compise a first planetary gear set that is a single pinion planetary gear set including a first sun gear, a first ring gear, and a first planetary carrier supporting a first pinion being in mesh with the first sun gear and the first ring gear therebetween, a second planetary gear set that is a single pinion planetary gear set including a second sun gear, a second ring gear, and a second planetary carrier supporting a second pinion being in mesh with the second sun gear and the second ring gear therebetween, and a third planetary gear set that is a single pinion planetary gear set including a third sun gear, a third ring gear, and a third planetary carrier supporting a third pinion being in mesh with the third sun gear and the third ring gear therebetween.

The first, second, and third ring gears of the first, second, and third planetary gear sets are integrally formed and fixed to an inner side of the speed-up mechanism housing, the first sun gear is connected with the second planetary carrier and the second sun gear is connected with the third planetary carrier, and rotational power inputted from the one-way power transmission mechanism through the first planetary carrier is increased in speeds and transmitted to the rotary shaft of the generator through the third sun gear.

The energy regeneration device according to the exemplary embodiment of the present invention may increase energy efficiency by regenerating kinetic energy from bumping or rebounding of a wheel, depending on traveling condition, into electric energy.

Alto, the energy regeneration device according to the exemplary embodiment of the present invention may absorb unnecessary torsional force and increase transmission efficiency of rotational power by forming protrusions between an outer pipe and an inner extension.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
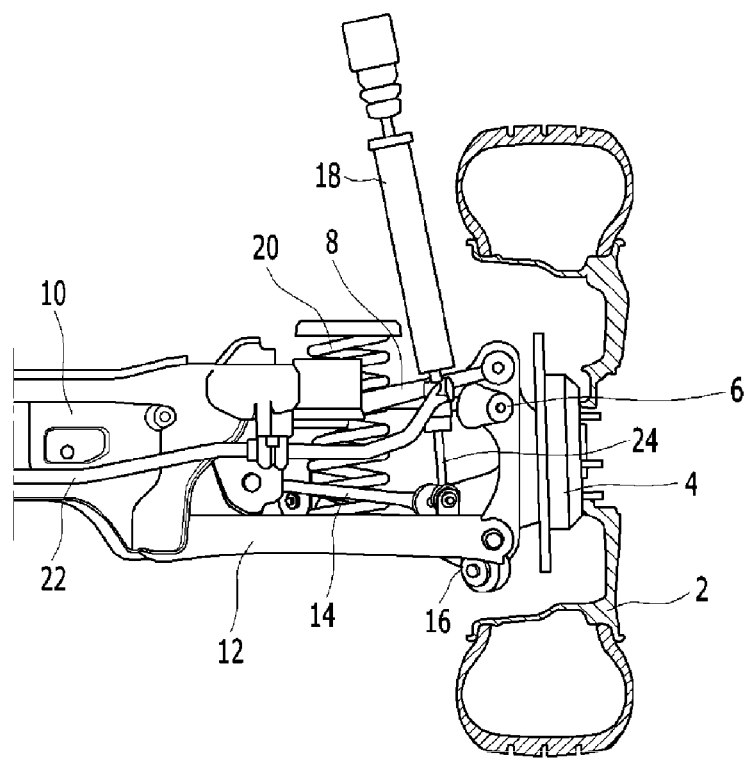
FIG. 1 is an exemplary schematic diagram of a common suspension system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described hereafter in detail with reference to the accompanying drawings.

Further, the sizes and thicknesses of the configurations shown in the drawings are provided selectively for the convenience of description, such that the present invention is not limited to those shown in the drawings and the thicknesses are exaggerated to make some parts and regions clear.

The unrelated parts to the description of the exemplary embodiments are not shown to make the description clear and like reference numerals designate like element throughout the specification.

Figure 2:
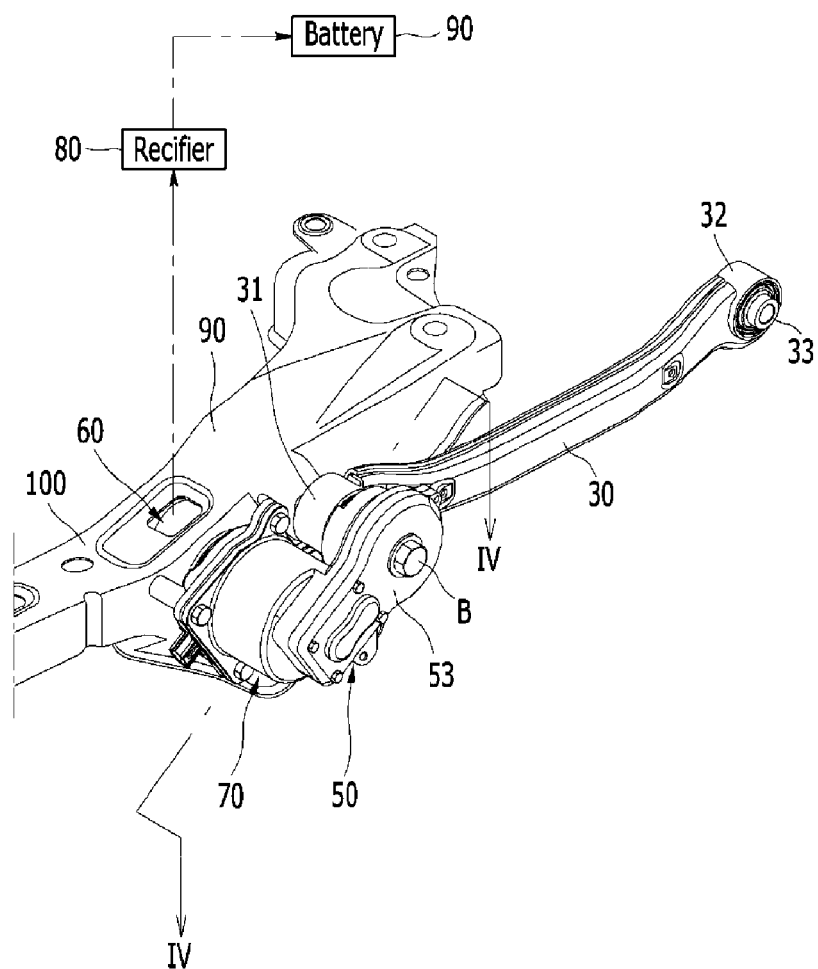
FIG. 2 is a perspective view showing an energy regeneration device according to an exemplary embodiment of the present invention.
Figure 3:
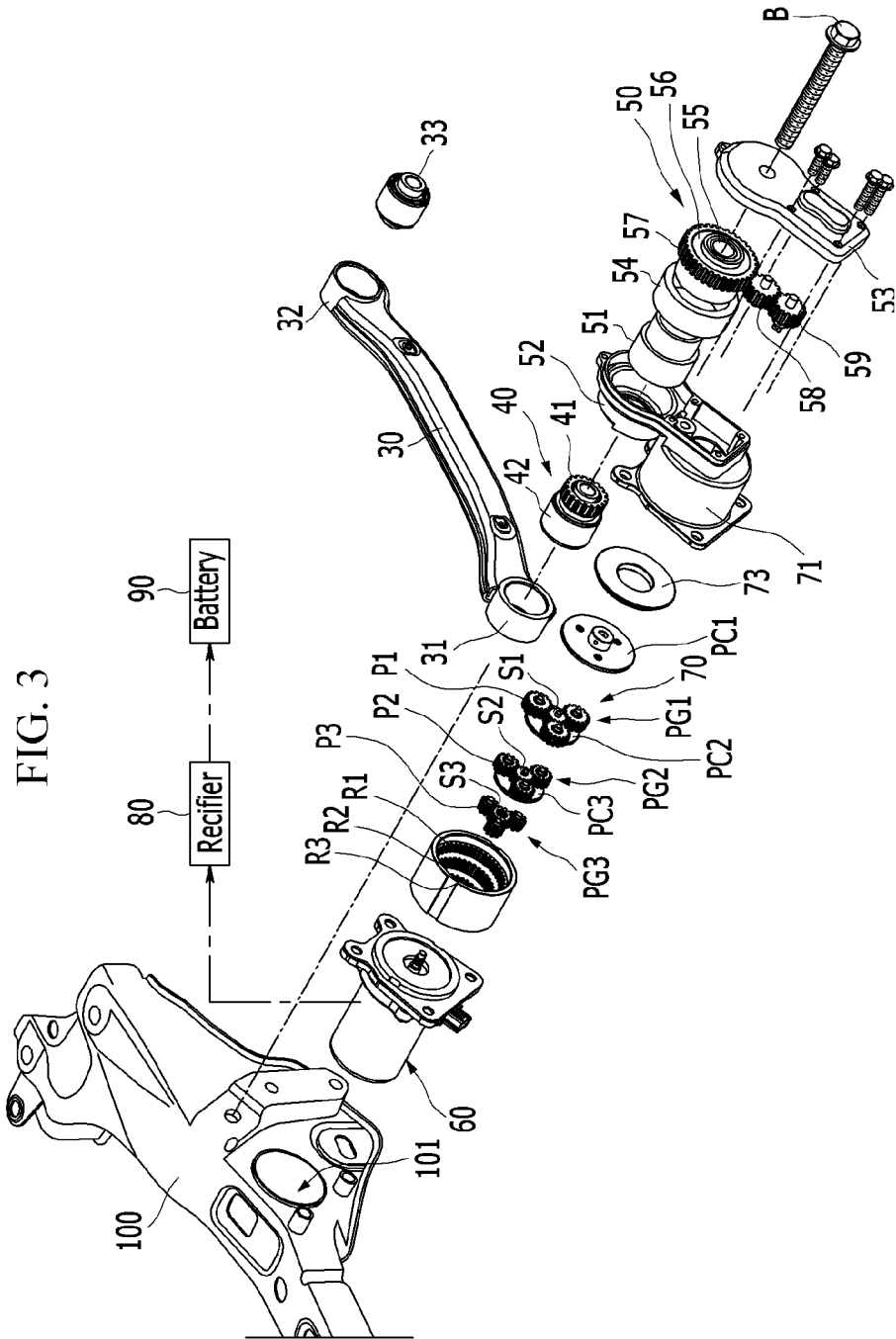
FIG. 3 is an exploded perspective view showing the energy regeneration device according to an exemplary embodiment of the present invention.
Figure 4:
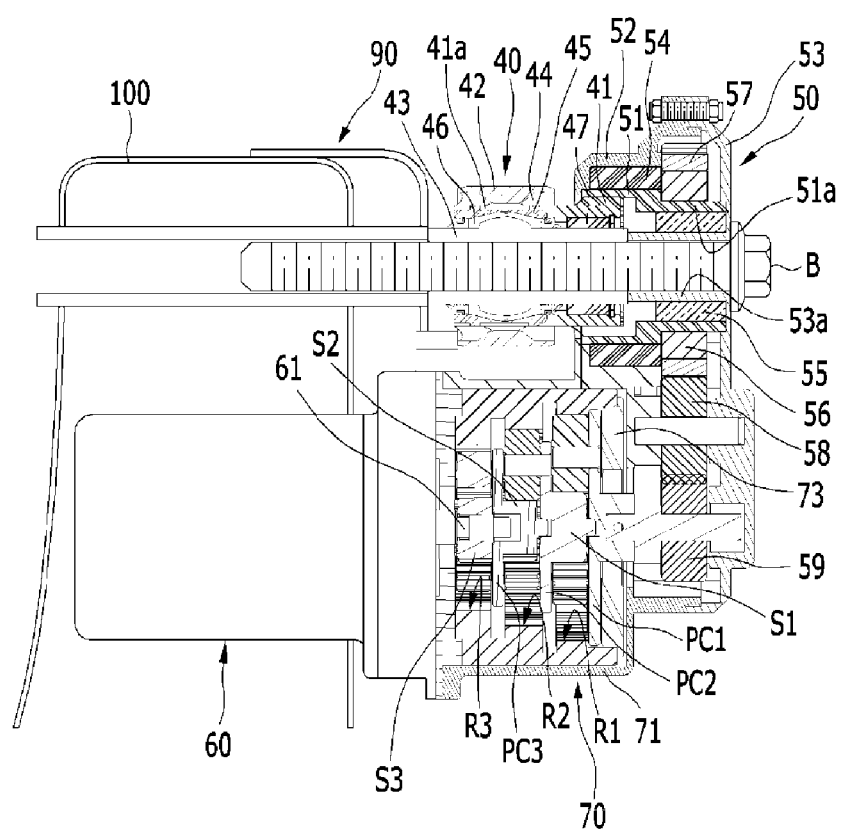
FIG. 4 is a cross-sectional view along line IV-IV of FIG. 2.
Figure 5:
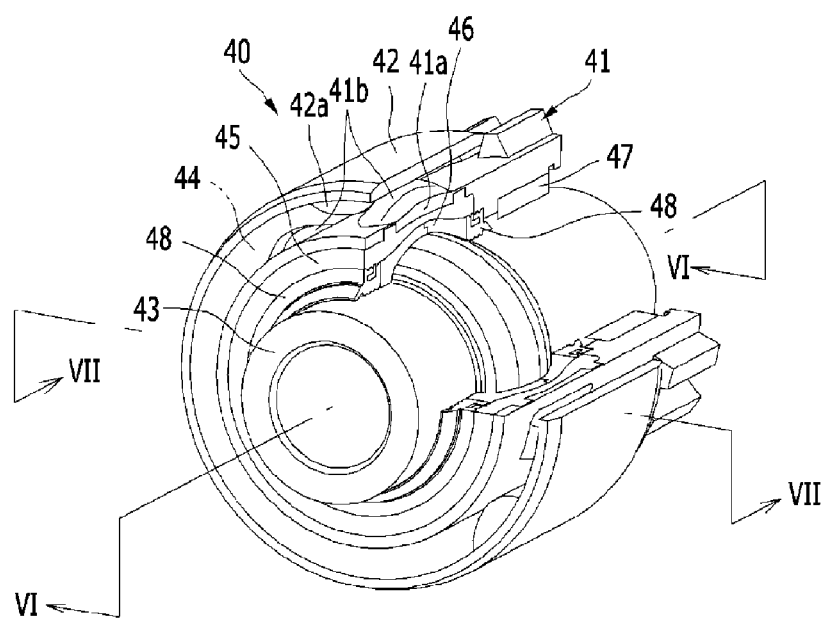
FIG. 5 is partially cut-away perspective view showing a bushing unit applied to an energy regeneration device according to an exemplary embodiment of the present invention.
Figure 6:
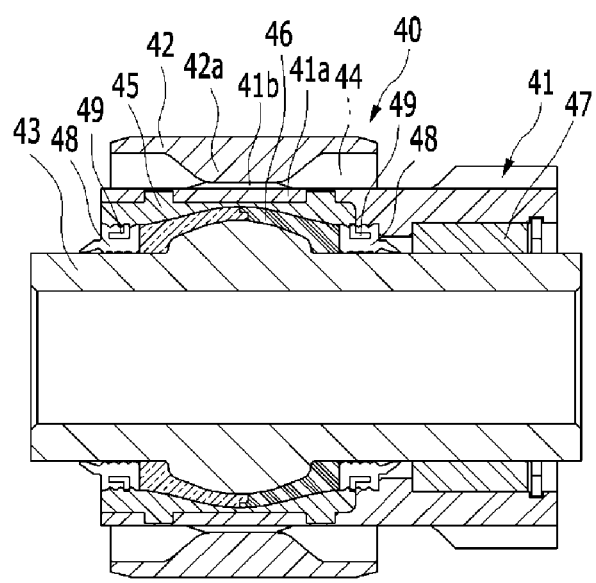
FIG. 6 is a cross-sectional view along line VI-VI of FIG. 5.
Figure 7:
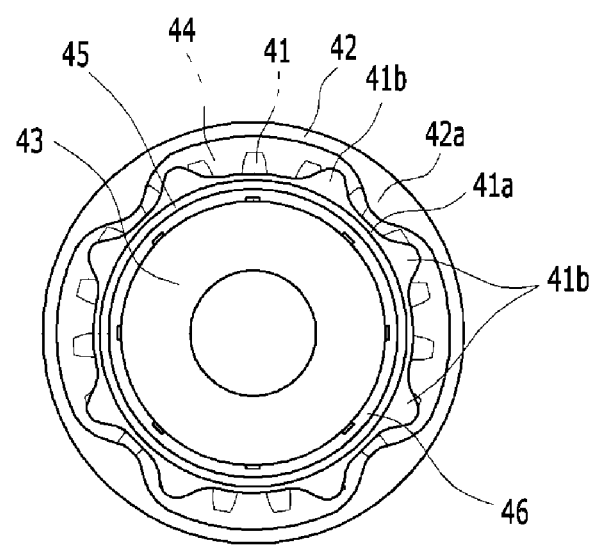
FIG. 7 is a cross-sectional view along line VII-VII of FIG. 5.

FIG. 2 is a perspective view showing an energy regeneration device according to an exemplary embodiment of the present invention, and FIG. 3 is an exploded perspective view showing the energy regeneration device according to an exemplary embodiment of the present invention. FIG. 4 is a cross-sectional view along line IV-IV of FIG. 2, and FIG. 5 is partially cut-away perspective view showing a bushing unit applied to an energy regeneration device according to an exemplary embodiment of the present invention. FIG. 6 is a cross-sectional view along line VI-VI of FIG. 5 and FIG. 7 is a cross-sectional view along line VII-VII of FIG. 5.

Referring to FIG. 2 to FIG. 4, an energy regeneration device according to an exemplary embodiment of the present invention may include a suspension link 30, a bushing unit 40, a one-way power transmission mechanism 50, a generator 60, a speed-up mechanism 70, rectifier 80 and a battery 90.

The suspension link 30 means all of links that connect a wheel carrier (see FIG. 1) to a vehicle body 100 (rear wheel member) and continuously bump and rebound, depending on the condition of a road.

The energy regeneration device according to an exemplary embodiment of the present invention is applied to a rear wheel strut type of suspension, as an example, but is not limited thereto.

That is, the suspension link 30 may be applied to all types of links that connect a wheel carrier to a vehicle body to make a link operation, in all types of suspensions, including a multilink type, a dual link type, and a (double) wishbone type, and may be applied to the front wheels too.

The bushing unit 40 is disposed between the vehicle body connection portion 31 of the suspension link 30 and the vehicle body 100 and outputs two-way rotational power of the vehicle body connection portion 31 due to rotation (pivot) of the suspension link 30 through an output gear 41.

The one-way power transmission mechanism 50 is connected with the output gear 41 of the bushing unit 40, receives the two-way rotation transmitted from the output gear 41 through an input gear 51, and transmits one-way rotational power to the speed-up mechanism 70.

The generator 60 generates electric energy while being rotated by the one-way rotational power transmitted from the speed-up mechanism 70.

The speed-up mechanism 70 increases the one-way rotational power transmitted from the one-way power transmission mechanism 50 and transmits the increased power to a rotary shaft 61 of the generator 60.

Further, the rectifier 80 is electrically connected with the generator 60 and rectifies the electricity generated by the generator 60 and the battery 90 is electrically connected with the rectifier 80 and accumulates electric energy.

The configuration of the energy regeneration device is described in more detail. The suspension link 30, a link member having a predetermined length, has a wheel connection portion 32 and the vehicle body connection portion 31 formed at both ends, respectively, the wheel connection portion 32 is connected with a wheel carrier (4 in FIG. 1) by a rubber bushing 33, and the vehicle body connection portion 31 is fastened to a vehicle body 100 through the bushing unit 40 by a bolt B.

Therefore, as the wheel connection portion 32 revolves (pivots) around the vehicle body connection portion 31, depending on the condition of a road, the vehicle body connection portion 31 generates rotational power in one direction (forward) and the other direction (backward) through the bushing unit 40.

The bushing unit 40 includes, as shown in FIG. 5 to FIG. 7, an outer pipe 42, an inner pipe 43, a rubber bushing 44, an output gear 41, a bearing support ring 45, and a first bearing 46.

The outer pipe 42 is combined with the vehicle body connection portion 31 of the suspension link 30 and of which a plurality of rotation protrusion 42a are formed to an internal circumference thereof.

The inner pipe 43 is disposed inside the outer pipe 42 and fixed to a side of the vehicle body 100 by a bolt B.

The rubber bushing 44 is disposed between the outer pipe 42 and the inner pipe 43 and may be bonded to the inner side of the outer pipe 42.

The output gear 41 has an inner extension 41a extending between the rubber bushing 44 and the inner pipe 43 and is connected to the rubber bushing 44 by the inner extension 41a.

A plurality of supporting protrusion 41b is formed to an exterior circumference of the inner extension corresponding to the rotation protrusion 42a.

In the drawings, four rotation protrusions 42a and eight supporting protrusions 41b are formed to the outer pipe 42 and the inner extension 41a of the output gear 41.

That is, two supporting protrusions 41b as a pair are disposed between two rotation protrusions 42a.

In the drawings, four rotation protrusions 42a and eight supporting protrusions 41b are formed respectively, however, it is not limited thereto. The numbers of rotation protrusions 42a and the supporting protrusions 41b may be various according to the sizes or design requirements.

The protrusion structure of the rotation protrusion 42a and the supporting protrusion 41b may absorb unnecessary torsional force and increase transmission efficiency of rotational power The bearing support ring 45 is fixed to the inner side of the inner extension 41a of the output gear 41 and supports the first bearing 46.

The first bearing 46 may be a plastic friction bearing and disposed on the outer side of the inner pipe 43. The first bearing 46 and the bearing support ring 45 may be injection-molded plastic products and may be in contact with each other with the friction coefficient minimized.

A second bearing 47 may be disposed between the inner side of the output gear 41 and the outer side of the inner pipe 43, in which the second bearing 47 may be a needle bearing.

A seal ring 48 for sealing between the first bearing and the bearing support ring is disposed thus foreign substance may not enter into the bushing unit 40.

The seal ring 48 is formed integrally with a stopper 49 fixed to the interior circumference of the bearing support ring 45.

The one-way power transmission mechanism 50, as shown in FIG. 3 and FIG. 4, includes an inner case 52 and an outer case 53, the inner case 52 is disposed at the bushing unit 40, and the outer case 53 is combined with the inner case 52 on the outside.

A bolt insertion pipe 53a extending axially inward to pass the bolt B through it is formed at the outer case 53.

Further, the one-way power transmission mechanism 50 includes an input gear 51, a third bearing 54, a fourth bearing 55, a one-way clutch 56, a speed-up gear 57, and one or more idle gears 58 and 59, which are disposed inside the inner case 52 and the outer case 53.

The input gear 51 has teeth around the inner side, engages with the output gear 41 inside the inner case 52 and the outer case 53, and has an outer extension 51a extending axially outward.

The third bearing 54 is disposed between the outer side of the input gear 51 and the inner side of the inner case 52 and the fourth bearing 55 is disposed between the inner side of the outer extension 51a and the outer side of the bolt insertion pipe 53a.

The one-way clutch 56 is disposed on the outer side of the outer extension 51a of the input gear 51 and the speed-up gear 57 is disposed on the outer side of the one-way clutch 56. The speed-up gear 57 receives only one-way rotational power from the one-way clutch 56 and rotates only in one direction.

Further, as shown in FIG. 3, the two idle gears 58 and 59 are in mesh with the speed-up gear 57 and transmit the one-way rotational power from the speed-up gear 57 to the speed-up mechanism 70. Although two idle gears 58 and 59 are provided in the drawings, the present invention is not limited thereto and one or three or more idle gears may be provided, depending on the space inside the inner case 52 and the outer case 53 and the number of teeth of the idle gears.

The one-way clutch 56 is disposed to connect the rotational power of the output gear 41 to the speed-up gear 57, when the suspension link 30 bumps, but the present invention is not limited thereto, and when the direction of the one-way clutch 56 is changed, it may connect the rotational power of the output gear 41 to the speed-up gear 57 when the suspension link 30 rebounds.

The generator 60 may be inserted in an installation hole 101 formed at one side of the member sided the vehicle body 100.

The generator 60 generates electricity, using the rotational power transmitted from the speed-up mechanism 70 increased in speeds.

The speed-up mechanism 70 includes one or more planetary gear sets PG1, PG2, and PG3 disposed in a speed-up mechanism housing 71 integrally formed between the generator 60 and the one-way power transmission mechanism 50, and although three planetary gear sets are provided in the drawings, the present invention is not limited thereto and an appropriate number of planetary gear sets that can increase the rotational speed in bumping or rebounding to the optimum speed for the generator 60 to generate electricity may be provided. The configuration composed of three planetary gear sets PG1, PG2, and PG3 is exemplified herein for better comprehension and ease of description.

All the three planetary gear sets PG1, PG2, and PG3 may be single pinion planetary gear sets and are connected such that ring gears R1, R2, and R3 of the single planetary gear sets PG1, PG2, and PG3, respectively, are fixed to the speed-up mechanism housing 71 to function as fixed elements, planetary carriers PC1, PC2, and PC3 function as input elements, and sun gears S1, S2, and S3 function as output element.

The first planetary gear set PG1, as a single pinion planetary gear set, includes the first sun gear S1, the first ring gear R1, and the first planetary carrier PC1 supporting a first pinion P1 being in mesh with the first sun gear S1 and the first ring gear R1 therebetween.

The second planetary gear set PG2, as a single pinion planetary gear set, includes the second sun gear S2, the second ring gear R2, and the second planetary carrier PC2 supporting a second pinion P2 being in mesh with the second sun gear S2 and the second ring gear R2 therebetween.

The third planetary gear set PG3, as a single pinion planetary gear set, includes the third sun gear S3, the third ring gear R3, and the third planetary carrier PC3 supporting a third pinion P3 being in mesh with the third sun gear S3 and the third ring gear R3 therebetween.

In the first, second, and third planetary gear sets PG1, PG2, and PG3, the first, second, and third ring gears R1, R2, and R3 are integrally formed and fixed to the inner side of the speed-up mechanism housing 71, the first sun gear S1 is connected with the second planetary carrier PC2, and the second sun gear S2 is connected with the third planetary carrier PC3.

Accordingly, the speed-up mechanism 70 increases the rotational speed inputted through the first planetary carrier PC1 from the idle gear 59 of the one-way power transmission mechanism 50 in several steps and transmits the increased the rotational speed to the rotary shaft 61 of the generator 60 through the third sun gear S3.

The first planetary carrier PC1 is supported by a support disc 73.

Figure 8:
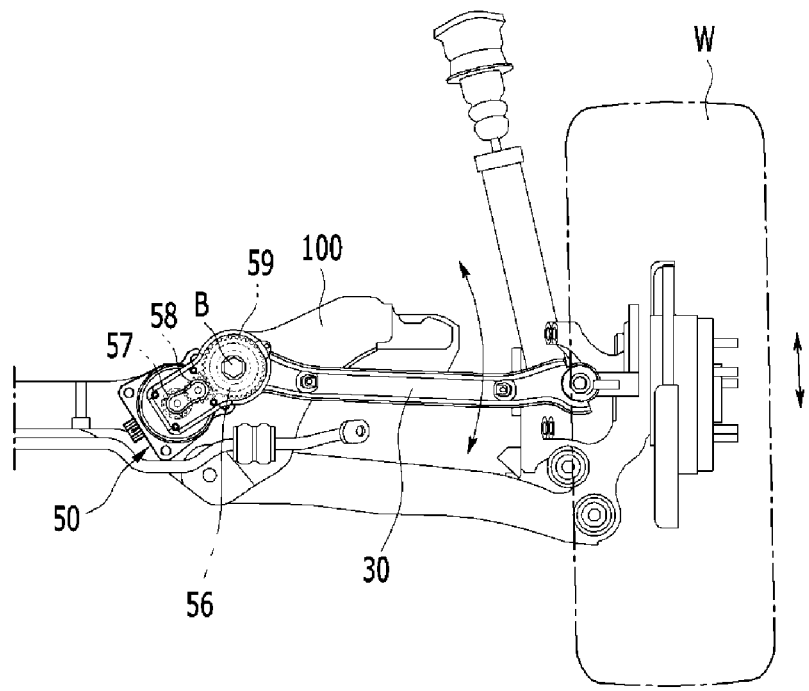
FIG. 8 is a view illustrating an operation status of the energy regeneration device according to an exemplary embodiment of the present invention.

Therefore, in the energy regeneration device of a suspension system for a vehicle having the configuration described above, as shown in FIG. 8, as the wheel W continuously repeats bumping and rebounding, depending on the condition of the surface of a road, the suspension link 30 repeatedly rotates the outer pipe 42 of the bushing unit 40 in one direction (forward) and the other direction (backward) inside the vehicle body connection portion 31.

Accordingly, the outer pipe 42 attenuates the rotational force with the bush rubber 44 and transmits the rotational force to the output gear 41 and the output gear 41 transmits rotational power to the one-way clutch 56 through the input gear 51.

The rubber bushing 44 may absorb twist in bumping or rebounding of the outer pipe so that damage of the bushing unit 40 may be prevented.

In this case, as shown in FIG. 7, the rotation protrusion 42a formed to the interior circumference of the outer pipe 42 may transmits rotation power to the supporting protrusion 41b formed to the exterior circumference of the inner extension 41a of the output gear 41 with relatively small power loss.

Depending on the installation direction, the one-way clutch 56 transmits only one-way rotational power in bumping to the speed-up gear 57 without transmitting rotational power in rebounding, or on the contrary, it transmits only the rotational power in rebounding without transmitting the one-way rotational power in bumping to the speed-up gear 57.

The speed-up gear 57 transmits the one-way rotational power to the speed-up mechanism 70 through the idle gears 58 and 59 and the speed-up mechanism 70 speeds up the one-way rotational power inputted by the operation of one or more planetary gear sets PG1, PG2, and PG3 and transmits the one-way rotational power increased in speeds to the generator 60, thereby generating electricity.

The electricity generated by the generator 60 is rectified by the rectifier 80, as described above, and the battery 90 is charged.

That is, the kinetic energy from movement of a vehicle is regenerated into electric energy, such that energy efficiency can be increased.

Further, the energy regeneration device operating with the configuration, as described above, can be applied to the vehicle body connection portion of all of suspension links pivoting up/down, depending on the condition of a road regardless of the configuration type of the suspension, that is, all types of links connecting a wheel carrier with a vehicle body to make a link operation, in all of suspension links, including a multilink type, a Macpherson type, a dual link type, and a (double) wishbone type, and can regenerate energy.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. An energy regeneration device of a suspension system for a vehicle, the device comprising:
    a suspension link that connects a wheel carrier to a vehicle body;
    a bushing unit that is disposed between a vehicle body connection portion of the suspension link and the vehicle body and outputs hinge motion of the suspension link through an output gear;
    a one-way power transmission mechanism that is engaged with the output gear of the bushing unit, receives the hinge motion transmitted from the output gear through an input gear, and outputs only one-way rotational power; and
    a generator that is disposed at a first side of the vehicle body, is engaged with the one-way power transmission mechanism, and generates electricity while being rotated by the transmitted one-way rotational power;
    wherein the bushing unit comprises:
    an outer pipe combined with the vehicle body connection portion of the suspension link wherein a plurality of rotation protrusions are formed to an internal circumference of the outer pipe;
    an inner pipe disposed inside the outer pipe and fixed to a second side of the vehicle body;
    a rubber bushing disposed between the outer pipe and the inner pipe and bonded to the outer pipe;
    wherein the output gear is coupled with the rubber bushing through an inner extension that extends between the rubber bushing and the inner pipe, wherein a plurality of supporting protrusions are formed to an external circumference of the inner extension;
    a bearing support ring fixed to an inner side of the inner extension of the output gear; and
    a first bearing disposed on an outer side of the inner pipe in friction contact with the bearing support ring.

2. The energy regeneration device of claim 1, further comprising:
    a speed-up mechanism that couples the generator and the one-way power transmission mechanism, speeds up the one-way rotational power transmitted from the one-way power transmission mechanism, and transmits the one-way rotational power increased in speed to a rotary shaft of the generator;
    a rectifier that is electrically connected with the generator and rectifies the electricity generated by the generator; and
    a battery that is electrically connected with the rectifier and accumulates electric energy.

3. The energy regeneration device of claim 1, wherein:
    the plurality of rotation protrusions and the plurality of supporting protrusions are formed at a predetermined distance from each other, and
    two supporting protrusions as a pair are disposed between two rotation protrusions.

4. The energy regeneration device of claim 2, further comprising a seal ring configured to form a seal between the first bearing and the bearing support ring.

5. The energy regeneration device of claim 4, wherein the seal ring is formed integrally with a stopper fixed to an interior circumference of the bearing support ring.

6. The energy regeneration device of claim 2, wherein the one-way power transmission mechanism comprises:
    an inner case;
    an outer case combined with the inner case and having a bolt insertion pipe in which a bolt is inserted;
    wherein the input gear is engaged with the output gear of the bushing unit, the input gear located inside the inner case and the outer case, and the input gear having an outer extension extending axially outward;
    a third bearing disposed between an outer side of the input gear and an inner side of the inner case;
    a fourth bearing disposed between an inner side of the outer extension and an outer side of the bolt insertion pipe;
    a one-way clutch disposed on an outer side of the outer extension;
    a speed-up gear disposed on an outer side of the one-way clutch; and
    one or more idle gears transmitting one-way rotational power to the speed-up mechanism in mesh with the speed-up gear.

7. The energy regeneration device of claim 6, wherein the one-way clutch transmits rotational power from the output gear of the bushing unit to the speed-up gear in bumping or in rebounding of the suspension link.

8. The energy regeneration device of claim 2, wherein the speed-up mechanism comprises:
    a speed-up mechanism housing integrally formed between the generator and the one-way power transmission mechanism; and
    one or more planetary gear sets disposed in the speed-up mechanism housing.

9. The energy regeneration device of claim 8, wherein the one or more planetary gear sets are single pinion planetary gear sets.

10. The energy regeneration device of claim 8, wherein the one or more planetary gear sets include three single pinion planetary gear sets.

11. The energy regeneration device of claim 10, wherein a ring gear of each of the single pinion gear sets is fixed to the speed-up mechanism housing and functions as a fixed element, a planetary carrier thereof functions as an input element, and a sun gear thereof functions as an output element.

12. The energy regeneration device of claim 10, wherein the three planetary gear sets comprise:
    a first planetary gear set that is a single pinion planetary gear set including a first sun gear, a first ring gear, and a first planetary carrier supporting a first pinion being in mesh with the first sun gear and the first ring gear therebetween;
    a second planetary gear set that is a single pinion planetary gear set including a second sun gear, a second ring gear, and a second planetary carrier supporting a second pinion being in mesh with the second sun gear and the second ring gear therebetween; and
    a third planetary gear set that is a single pinion planetary gear set including a third sun gear, a third ring gear, and a third planetary carrier supporting a third pinion being in mesh with the third sun gear and the third ring gear therebetween.

13. The energy regeneration device of claim 12, wherein the first, second, and third ring gears of the first, second, and third planetary gear sets are integrally formed and fixed to an inner side of the speed-up mechanism housing, the first sun gear is connected with the second planetary carrier and the second sun gear is connected with the third planetary carrier, and rotational power inputted from the one-way power transmission mechanism through the first planetary carrier is increased in speed and transmitted to the rotary shaft of the generator through the third sun gear.

* * * * *